United States Patent [19]

Anderson, Jr.

[11] 3,834,773

[45] Sept. 10, 1974

[54] UNIT BEARING MOTOR

[75] Inventor: Gordon R. Anderson, Jr., Roscoe, Ill.

[73] Assignee: Airtrol Corporation, Rockton, Ill.

[22] Filed: June 13, 1973

[21] Appl. No.: 369,565

Related U.S. Application Data

[62] Division of Ser. No. 241,703, April 6, 1972, Pat. No. 3,763,386.

[52] U.S. Cl. .............................................. 308/132
[51] Int. Cl. .......................................... F16c 13/02
[58] Field of Search........................... 308/132, 111

[56] References Cited
UNITED STATES PATENTS 3,361,496  1/1968  Cunningham...................... 308/132

Primary Examiner—Charles J. Myhre
Assistant Examiner—Frank Susko
Attorney, Agent, or Firm—Wolfe, Hubbard, Leydig, Voit & Osann, Ltd.

[57] ABSTRACT

The rotor of a shaded-pole motor includes a central housing supported on a stationary shaft by two axially spaced sleeve bearings which are lubricated by an oil impregnated tubular liner telescoped into the housing and sandwiched between the inboard faces of the bearings. The bearings include a pair of slanted passageways extending through portions thereof from the inner walls of the bearings adjacent the shaft to the inboard faces so that the outer surface of the shaft is in communication with the liner. As the bearings rotate, oil bleeding along the shaft accumulates in the passageways and, by virtue of the centrifugal force generated by the rotating bearing, is slung through the passageways and back to the liner to prevent the oil from leaking out of the housing.

2 Claims, 8 Drawing Figures

PATENTED SEP 10 1974 3,834,773
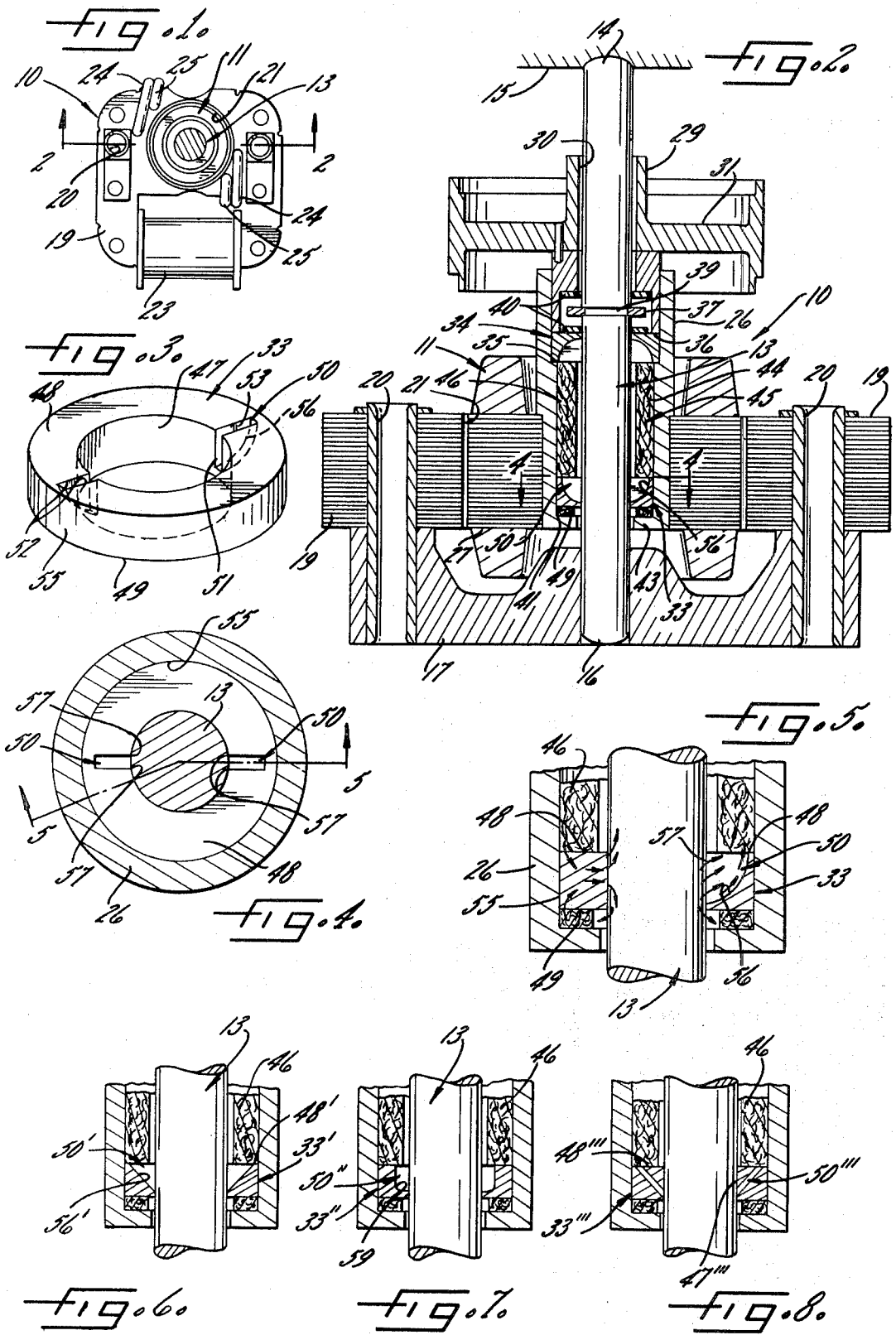

UNIT BEARING MOTOR

This is a division of application Ser. No. 3,763,386 now U.S. Pat. No. 241,703, filed Apr. 6, 1972.

BACKGROUND OF THE INVENTION

This invention relates to electric motors and the like and, more particularly, to an electric motor of the type having a pair of axially spaced sleeve bearings which are telescoped into a housing carried by a rotor and rotate on a stationary shaft projecting from a stator assembly. The bearings are made of porous material and are adapted to be permanently lubricated by an oil impregnated liner which is telescoped into the housing around the shaft and is sandwiched between the opposing inboard faces of the bearings. Motors of this general type are disclosed in Lautner U.S. Pat. No. 2,904,709 and in Anderson et al. U.S. Pat. No. 3,626,221.

SUMMARY OF THE INVENTION

The general aim of the present invention is to provide a new and improved permanently lubricated motor which, as compared to prior motors of the same general character, is sealed more effectively to protect against oil leaking along the shaft and out of the housing and thus experiences an increased service life. A more detailed object is to prevent the loss of oil seeping along the shaft by returning such oil to be absorbed back into the liner before the oil bleeds past the bearings and out of the housing.

Primarily, the invention resides in the provision of a unique passageway formed through at least one of the bearings and communicating between the liner and the surface of the shaft so that the oil seeping along the shaft accumulates in the passageway and is slung back to the liner by the centrifugal force generated by the rotating bearing. Moreover, this unique structure also takes advantage of the tendency of the oil to flow along a path of least resistance so that, when the motor is idle, oil tends to accumulate in the passageway adjacent the shaft rather than to bleed out of the housing between the shaft and bearing.

These and other objects and advantages of the present invention will become more apparent from the following detailed description when taken in conjunction with the accompanying drawings.

BRIEF DESCRIPTION OF THE DRAWINGS

FIG. 1 is a front elevational view of a new and improved electric motor embodying the novel features of the present invention.

FIG. 2 is an enlarged fragmentary cross-sectional view taken substantially along the line 2—2 of FIG. 1.

FIG. 3 is an enlarged perspective view of a part of the motor.

FIG. 4 is an enlarged fragmentary cross-sectional view taken substantially along the line 4—4 of FIG. 2.

FIG. 5 is a fragmentary cross-sectional view taken substantially along the line 5—5 of FIG. 4.

FIGS. 6, 7 and 8 are fragmentary cross-sectional views similar to FIG. 5 but showing alternative embodiments of the present invention.

DETAILED DESCRIPTION OF THE PREFERRED EMBODIMENTS

As shown in the drawings for purposes of illustration, the invention is embodied in a shaded-pole motor 10 generally comprising a cylindrical rotor 11 journaled for rotation on a rigid shaft 13 whose one end 14 is secured in a wall 15 and whose other end 16 projects outwardly from the base or frame bracket 17 of a stator assembly. The frame bracket supports a field core 19 which is formed by sets of stacked laminations secured to the bracket by pins 20 and defining a cylindrical opening 21 within which the rotor is disposed. Wrapped around a portion of the stator is a primary winding 23 adapted for connection to a source of alternating current voltage, and placed in selected positions in the stator are the usual shading coils 24 and 25.

Herein, the rotor 11 is of the squirrel-cage type and includes a central tubular housing 26 (FIG. 2) press-fitted into a series of sheet metal stampings 27. A plurality of conductor rods (not shown) extending through the stampings form the secondary windings of the motor. Alternatively, the housing 26 may be formed as an integral part of the secondary winding of the motor 10. Press-fitted into the outer end of the housing is a hub 29 which is telescoped over the shaft 13, the diameter of the axial opening 30 of the hub being somewhat larger than the diameter of the shaft to avoid frictional engagement therewith when the hub rotates about the shaft with the rotor. An annular flange 31 extends radially outwardly from the hub to support a device such as a fan (not shown) which is to be driven by the motor.

As shown in FIG. 2, the housing 26 is telescoped onto the shaft 13 and is supported thereon by inner and outer, axially spaced sleeve bearings 33 and 34 which are press-fitted into the housing and received rotatably on the shaft with a running fit so that the rotor 11 can turn freely on the shaft. The outer bearing 34 is captivated between an annular shoulder 35 within the housing and the inner end 36 of the hub 29. A snap ring 37 mounted within an annular groove 39 in the shaft holds the rotor 11 axially on the shaft while two nylon thrust washers 40 are disposed loosely around the shaft on opposite sides of the snap ring to protect the bearing and the housing against damage by the snap ring. The inner bearing 33 seats against an absorbent felt ring 41 which is telescoped over the shaft and is supported within the inner end of the housing by an annular flange 43 extending radially toward the shaft from the inner wall 44 of the housing.

Formed between the bearings 33 and 34 is a chamber 45 (FIG. 2) adapted to hold a quantity of oil for lubricating the bearings during the entire service life of the motor. A cylindrical liner 46 of felt or other absorbent material for conducting oil to the bearings is disposed within the chamber with its ends contacting the inboard faces 48 of the bearings. The liner is pressed into the housing 26 and is telescoped loosely over the shaft 13 so as to leave the rotor 11 free to turn without being retarded as a result of frictional contact of the liner with the shaft. The bearings are made of sintered metal and are somewhat porous so that oil delivered to the bearings by the liner may work its way through the bearings to lubricate the shaft between the latter and the bearings and thus reduce wear and rubbing friction.

While there are two sleeve bearings shown in the primary embodiment, they are, in essence, the structural and functional equivalents of each other. Accordingly, to avoid needless repetition, only the inner bearing 33 is described hereafter in detail with the understanding that such description applies equally well to the outer bearing 34 unless specified otherwise.

As shown in FIG. 5, the oil normally flows by capillary action from the liner 46 into and through the bearing 33 and generally radially toward the outer surface of the shaft 13 to reduce friction between the shaft and the inner surface 47 (FIG. 3) of the bearing. Upon reaching the shaft, the oil tends to divide and tends to flow along two separate paths, one of which leads back to the liner and the other of which leads along the shaft, past the outboard face 49 of the bearing and beyond the end of the housing 26.

In accordance with the primary aspect of the present invention, possible oil losses resulting from leakage along the shaft 13 are virtually eliminated by provision of a unique passageway 50 in the bearing 33 which picks up excess oil bleeding along the shaft and slings the oil back to the chamber 45. For this purpose, the passageway extends through a portion of the bearing with the opposite ends of the passageway opening in adjacent surfaces of the bearing to communicate between the liner 46 and the outer surface of the shaft. With this arrangement, the oil flowing between the shaft and the inner surface 47 of the bearing accumulates in the passageway and, by virtue of centrifugal force, is slung through the passageway and back to the liner rather than bleeding past the outer face 49 of the bearing and out of the housing 26.

In the present instance, two of the passageways 50 are formed in the bearing 33 such as by machining or molding pie-shaped slots in positions diametrically spaced from each other. Two slots or more are preferred in order to keep the bearing balanced even though only a single slot is necessary to eliminate oil leakage. More particularly, each of the slots is defined by two parallel side walls 52 connected together by an arcuate bottom wall 56, one end of the bottom wall being spaced from the outer wall 55 and the other end of the bottom wall being spaced from the outboard face 49 of the bearing as shown in FIGS. 3 and 5. The inlet ends 51 of the two slots open out of the inner wall 47 and face each other and the shaft 13. The outlet ends 53 of the slots open out of the inboard face 48 of the bearing and face the end of the liner 46. With this arrangement, the slots defining the two passageways extend through diametrically opposed portions of the bearing and slant in directions generally radially away from and generally axially along the shaft 13 toward the chamber 45 of the housing 26.

As the rotor 11 spins around the shaft 13, the slotted bearing 33 acts, in effect, like a pump impeller to draw in the excess oil from the surface of the shaft adjacent the inner wall 47 of the bearing and to pump the oil through the passageways 50 and back to the liner 46. Advantageously, as the oil bleeds along the surface of the shaft after leaving the inner wall of the bearing, the edges 57 of the inlet ends 51 of the passageways 50 wipe along the surface of the shaft to pick up any excess oil which otherwise would leak out of the housing 26. As the oil accumulates in the inlet ends of the passageways, the centrifugal force resulting from the rotating bearing slings the excess oil along the bottom walls 56 and back toward the liner 46. Since the oil tends to flow along a path of least resistance (i.e., into the inlet end of the passageway and through the passageway), virtually all of the excess oil bleeding along the shaft is driven back to the liner and thus is kept from being lost. Moreover, when the rotor is at rest, the oil also tends to gravitate by capillary action into the more open passageways rather than to seep along the shaft and out of the housing. If, however, some oil should escape past the bearing, such oil is absorbed by the ring 41.

While the present invention is shown to include a pair of bearings 33 and 34 spaced from each other along the shaft 13 which is anchored at both ends, it will be realized that the invention is adapted equally well for use in a motor of the type disclosed in the Lautner and Anderson et al patents previously mentioned wherein the shaft is anchored only at one end and the housing is sealed closed over the free end of the shaft. With motors of this latter type, only the bearing adjacent the anchored end of the shaft need be of the type disclosed herein in order to take advantage of the unique features of the present invention.

Other embodiments of the present invention are illustrated in FIGS. 6, 7 and 8 and include passageways designated 50', 50" and 50''', each having a different physical shape from the shape of the passageway 50 of the preferred embodiment. In FIG. 6, the passageway 50' comprises a generally triangular shaped slot similar to the slot described in the preferred embodiment but with a bottom wall 56' which slants straight toward the inboard face 54' of the bearing rather than curving as does the bottom wall 56 of the slot 50. FIG. 7 illustrates still another arrangement but with a generally rectangular-shaped slot 50" having a rounded corner 59 spaced radially outwardly from the shaft 13. The embodiment illustrated in FIG. 8 is slightly different than the previous embodiments in that the passageway 50''' comprises a hole which is formed on a slant to extend from the inboard face 48''', through the bearing and out the inner wall 47'''. As with the preferred embodiment, in each of the alternate embodiments, oil is drawn from the outer surfaces of the shafts 13, and is pumped through the passageways and back to the liners 46 for recirculation through the bearings 33', 33" and 33''' by the centrifugal force of the rotating bearings.

Although the various embodiments of the invention are illustrated for use in an electric motor 10, the invention also may be used to equal advantage in devices other than electric motors. In particular, the unique features of the present invention may be used to advantage in almost any device where it is desirable to provide permanent, non-leaking lubrication to a bearing which rotatably mounts a member on a shaft. An example of one such device is a unit bearing idler assembly (not shown) such as a capstan for a recording device.

I claim as my invention:

1. An apparatus comprising a base, a shaft fixed to said base, a tubular housing telescoped over said shaft, a cylindrical liner impregnated with oil and telescoped into the housing around the shaft, a sleeve bearing having opposite inboard and outboard faces and fixed within said housing, said bearing being rotatable on said shaft and having an inner wall located adjacent said shaft, said liner being captivated within the housing by said bearing with the inboard face thereof in engagement with the end of the liner, a passageway extending through a portion of the bearing and communicating between said shaft and the end of the liner, said passageway slanting from an inlet in the inner wall to an outlet in the inboard face of the bearing whereby oil seeping between the shaft and the inner wall collects in the inlet and is slung through the passageway and back to the liner by the centrifugal force generated when the bearing is rotated on the shaft.

2. An apparatus comprising a base, a shaft fixed to said base, a tubular housing telescoped over said shaft, two axially spaced sleeve bearings fixed within said housing and rotatable on said shaft, a cylindrical liner impregnated with oil telescoped into the housing and over said shaft and sandwiched between the inboard faces of said bearings, a passageway extending through a portion of one of the bearings and having an inlet in the inner wall of said bearing along the surface of the shaft and an outlet in the inboard face of said bearing adjacent the end of the liner whereby oil seeping along the surface of the shaft collects in said inlet and is slung through the passageway and back to the liner by the centrifugal force generated when the bearing is rotated on the shaft.

* * * * *